(12) United States Patent
Davydov et al.

(10) Patent No.: US 9,610,714 B2
(45) Date of Patent: Apr. 4, 2017

(54) PROCESS FOR THE MANUFACTURE OF THIN-WALLED ELASTOPOROUS PARTS IN THE FORM OF BUSHINGS IN METAL-RUBBER (MR)

(71) Applicant: Samara State Aerospace University, Samara (RU)

(72) Inventors: Danila Petrovich Davydov, Samara (RU); Gennady Vasilievich Lazutkin, Samara (RU); Petr Vladimirovich Bondarchuk, Samara (RU); Alexander Ivanovich Ermakov, Samara (RU); Tatiana Viktorovna Volkova, Samara (RU)

(73) Assignee: Samara State Aerospace University, Samara (RU)

(*) Notice: Subject to any disclaimer, the term of this patent is extended or adjusted under 35 U.S.C. 154(b) by 206 days.

(21) Appl. No.: 14/570,549

(22) Filed: Dec. 15, 2014

(65) Prior Publication Data
US 2015/0343677 A1     Dec. 3, 2015

(30) Foreign Application Priority Data

May 28, 2014   (EA) .................................. 201400588

(51) Int. Cl.
*B23P 17/00*     (2006.01)
*B21D 53/10*     (2006.01)
(Continued)

(52) U.S. Cl.
CPC .............. *B29C 43/18* (2013.01); *B01D 39/12* (2013.01); *B21F 27/18* (2013.01); *B29C 43/027* (2013.01);B01D 39/08; B01D 39/10; B01D 39/12; B21F 27/18; B29K 2021/00; B21K 2021/006; Y10T 29/496; Y10T 29/49602;
(Continued)

(58) Field of Classification Search
CPC ....... B29C 43/14; B29C 43/18; B29C 43/027; B29C 2043/029; B29C 2043/141;
(Continued)

(56) References Cited

U.S. PATENT DOCUMENTS 5,968,357 A * 10/1999 Doelle .................. B01D 29/111
                                                              209/404
6,923,907 B2 * 8/2005 Hobbs ................. B01F 13/0059
                                                              210/198.2
(Continued)

FOREIGN PATENT DOCUMENTS

| CA | 2323430 A1 * | 9/1999 | ........... B29C 33/123 |
| RU | 2402400 | 10/2010 | ............. B21F 45/00 |
| RU | 2470695 | 12/2012 | ............. B01D 39/12 |

OTHER PUBLICATIONS

Author's Certificate No. 183174, published on Jan. 1, 1966.

*Primary Examiner* — Essama Omgba
(74) *Attorney, Agent, or Firm* — Matthew A. Pequignot; Pequignot + Myers LLC

(57) ABSTRACT

A process for the manufacture of thin-walled elasto-porous elements in the form of bushings in metal-rubber material (MR), comprises the steps of: obtaining wire fragments in the form of spirals having a lead equal to the spiral diameter, forming a flat blank from said spiral segments; pressing the blank into a roll; placing the roll into a mold; placing some elastic medium inside said roll; and pressing the roll in several passes by axial compression together with the elastic medium elements transforming the axial compression into radial pressure on the roll to be compressed.

4 Claims, 4 Drawing Sheets

(51) Int. Cl.
    *B29C 43/18* (2006.01)
    *B29C 43/02* (2006.01)
    *B29C 43/14* (2006.01)
    *B01D 39/12* (2006.01)
    *B21F 27/18* (2006.01)
    *B29K 21/00* (2006.01)
    *B29K 305/00* (2006.01)

(52) U.S. Cl.
    CPC ........ *B29C 43/14* (2013.01); *B29C 2043/029* (2013.01); *B29C 2043/141* (2013.01); *B29K 2021/006* (2013.01); *B29K 2305/00* (2013.01)

(58) Field of Classification Search
    CPC .......... Y10T 29/4998; Y10T 29/49636; Y10T 29/49668; Y10T 29/49671; Y10T 29/49673; Y10T 29/49675
    See application file for complete search history.

(56) References Cited

U.S. PATENT DOCUMENTS

| | | | | |
|---|---|---|---|---|
| 7,137,199 B2* | 11/2006 | Schug | ................... | B29C 43/18 29/508 |
| 7,435,280 B2* | 10/2008 | Greenwood | ........... | B01D 39/12 280/736 |
| 8,066,841 B2* | 11/2011 | Ganz | ...................... | B29C 65/46 156/272.4 |
| 2003/0150806 A1* | 8/2003 | Hobbs | ................. | B01F 13/0059 210/635 |
| 2004/0052884 A1* | 3/2004 | Schug | ..................... | B29C 43/18 425/111 |
| 2005/0095178 A1* | 5/2005 | Heidenreich | ........... | B01D 39/12 422/177 |
| 2005/0155702 A1* | 7/2005 | Ganz | ...................... | B29C 65/46 156/272.4 |
| 2006/0037298 A1* | 2/2006 | Greenwood | ........... | B01D 39/12 55/525 |
| 2006/0085963 A1* | 4/2006 | Balczun | ................. | B29C 43/18 29/428 |
| 2008/0199642 A1* | 8/2008 | Barlow | ................. | B29C 43/021 428/34.5 |
| 2008/0286166 A1* | 11/2008 | Heidenreich | ........... | B01D 39/12 422/177 |
| 2015/0048022 A1* | 2/2015 | Odell | ..................... | B29C 43/18 210/499 |

* cited by examiner

PROCESS FOR THE MANUFACTURE OF THIN-WALLED ELASTOPOROUS PARTS IN THE FORM OF BUSHINGS IN METAL-RUBBER (MR)

CROSS-REFERENCE TO RELATED APPLICATIONS

The present invention claims priority from Eurasian Patent Application No. 201400588 filed May 28, 2014, which is incorporated herein by reference.

TECHNICAL FIELD

The present invention relates to mechanical engineering, and in particular to the manufacture of elastoporous parts in wired materials such as metal-rubber (MR), designed to provide vibration-proof insulation and damping of dangerous vibrations in mechanical systems, as well as to provide filtering of liquid and gaseous fluids, including extraction of the same from boreholes.

BACKGROUND OF THE INVENTION

It is known a process for the manufacture of a metal-rubber nonwoven material with metal wire (USSR Author's Certificate No 183174, Int. Cl. B21F 21/00, published on 1966.01.01), in which a spiral made of cold-hardened wire and extended to get its lead equal to the spiral diameter is used to form a blank of spherical or other shape by winding of the spiral crossed in neighboring layers, and compressed in a mold by unidirectional cold pressing.

The MR material has a wide use in the manufacture of various filters, plain bearings, damped vibration isolators, elastoporous parts. Nevertheless, the pieces made of the MR material by unidirectional pressing present a substantial drawback. The vibration isolators and elastoporous parts are anisotropic and present different elastic and filtering properties in different directions. And what is more, the elastic and filtering properties in the direction of the pressing can differ from said properties in other directions even more than by a factor of 10.

A wire filter is known (patent RU 2470695, Int. Cl. B01D 39/12, published on Dec. 27, 2012), comprising the filtering part made as a body of revolution and consisting of wires wound in spirals laid in rows shifted one relative to each other in the filter axis plane and in the plane perpendicular to the last and submitted to pressing with the possibility to form a multilayer porous structure of the filtering part. Said filtering part is made as a ring with a cylindrical generating element. The wire filter is additionally provided with shells coaxial with the filtering part, embracing each of both ends of the filtering part and made as rings with a cylindrical generating element parallel to the cylindrical generating element of the filtering part ring, and presents a U-shaped section in the plane passing along the rotation axis of the filtering part, open from the side of the filtering part ends and having the possibility for the last to be deepened into the shell rings. The connection of both shells with the filtering part ends deepened into the same along the adjoining cylindrical surfaces is made rigid to form a unique piece and to seal the filtering part ends. Whereupon, the wire used is integrally drawn from one piece with a constant cross-section diameter, or wire fragments are used. The minimum thickness $B_1$ of the filtering part ring is at least 10 times more than the wire diameter d. The length h of the cylindrical generating element of each shell is equal to (0.8–1.0) thickness B of the shell ring wall in a radial direction which is at least equal to the thickness $B_1$ of the filtering part ring. The thickness B of the shell ring wall is equal to (0.01–0.2) of its outer diameter D, and the length of the cylindrical generating element H of the filter is equal to (0.5–5.0) outer diameter D of the shell ring. The diameter d of the wire cross-section is 0.05-1 mm, and the diameter $d_1$ of the spiral is made equal to 1-50 diameters d. The winding lead of spirals for wire fragments is preferably equal to the diameter d of the wire cross-section. Pressing is carried out in the direction of the filter axis with the possibility to form sickle-shaped pores in the porous structure of the filtering part by crossing wires in neighboring rows and by intersecting the spiral axes while laying the wire rows, the average size δ of the filtering part pores, depending on the diameter d of the wire cross-section, is defined by the relationship $$\delta = \frac{\Pi \cdot d}{1 - \Pi},$$

in mm, where Π is the predetermined porosity of the filtering part.

To a certain extent, the present patent relates to processes for the manufacture of filter elements. Pressing in the direction of the filter axis leads to the same drawbacks of the unidirectional pressing of pieces to be made in MR materials, that are analyzed above relative to the USSR Author's Certificate No 183174.

The use of dead-end rings with U-shape section to protect the filtering part ends against damages and to provide sealed joints for the filtration process is an efficient means for the service of the filters, but presents a series of important drawbacks. The lateral surface of the filtering part is reduced, which considerably affects its filtering and other characteristics related to the porous area. Furthermore, the fixation of the rings is not reliable since they are maintained on the filtering part ends only by friction forces. The friction forces values are not stable and decrease during the service life as a result of stress relief in the filtering part material, which can lead, during the filter regeneration, to the separation of the shells with the filtering part.

It is known as well a process for the radial-axial pressing of pieces from materials having disordered structure, in particular, from a wire metal-rubber material (patent RU 2402400, Int. Cl. B21F 45/00, published on Oct. 27, 2010). Such a process considerably eliminates the above mentioned drawbacks of the process for the manufacture of elastoporous parts according to the USSR Author's Certificate No 183174.

Said process comprises the steps of obtaining wire fragments in the form of extended spirals, forming a flat blank from said spiral segments, rolling it, placing the obtained rolled blank into a mold and pressing the blank in several passes. An element of elastic medium is placed into a mold on one side of the blank or on both sides of the same. Pressing of the blank is carried out by its axial compression together with the elements of elastic medium transforming the axial compression into radial pressure on the blank being processed. In this way, the necessary elastic characteristics of the piece to be pressed are provided both in axial and in radial directions, together with the possibility to manufacture a wide variety of parts having continuous and hollow sections.

The above described technical solution is the closest to the solution of the present invention with relation to the combination of essential features and to the technical result obtained.

As drawbacks of the process for the radial-axial pressing of pieces in the MR material according to the patent RU 2402400, one can consider the lack of relationship of technological parameters in the production chain while pressing a blank in several passes. It makes it impossible to achieve the technical result of obtaining new technological procedures implementing the process of the invention. Besides, rolling a flat blank to get assigned dimensions providing for arranging the roll into a mold and for the possibility to place the elastic medium elements is rather difficult to perform due to a low density of the flat blank, which is the reason of instability of the geometrical dimensions of the roll. It brings to the need to get additional operating steps in the blank pressing procedure. For example, the manufacture of a ring from the MR material (see patent RU No 2402400, example) requires three passes of blank pressing with three different elastic elements. These passes lead to the occurrence of a high total spread of geometrical characteristics due to the irregularity of the MR material structure, accumulated in the passes, and, as a consequence, to the decrease of elastomer elements reliability. The last fact is related to particularities of the elastomer deformation mechanics in the porous space of the MR material. The mentioned factors lead to substantial spread of mechanical characteristics and of reliability for finished products made with the MR material after their calibration with the use of elastic elements. The attempts to reduce such spread are caused by the search of rational forms for the elastic medium, which requires a wide extent of experimental work, of financial and time expenditure.

The object of the present invention is to provide a process for the manufacture of thin-walled elastoporous parts in the form of bushings in the MR material with the selection of the most rational parts for radial and axial pressings of blanks, as well as of their geometrical dimensions for every pressing pass in order to obtain high reliability with predetermined elastoporous characteristics of final products.

SUMMARY OF THE INVENTION

The technical result achieved by the implementation of the present invention lies in a new technological procedure developed which includes the process of the present invention, based on the correlation of the relationship between the main technological parameters for the production of elastoporous elements. This technological procedure enables to lay the industrial base for the manufacture, with the MR material, of a wide variety of thin-walled bushing-type elastoporous parts that provide for a high reliability and are used for the anti-vibration protection, for filtering liquid and gaseous media, etc.

To achieve said technical result, in the process for the manufacture of thin-walled elastoporous parts in the form of bushings in metal-rubber material, this process comprises the steps of obtaining wire fragments in the form of spiral segments having a lead equal to the spiral diameter, and forming a flat blank from said spiral segments, The flat blank is pressed in the direction perpendicular to the blank plane, the average density value $\rho_3$ of the flat blank is adjusted depending on the spiral outer diameter $d_1$, on the diameter d of the wire cross-section, and on the density $\rho$ of the wire material, linked by the following relationship $\rho_3=(2.0-2.8)B_1$, where $$B_1 = \rho\left(\frac{d}{d_1}\right)^2$$

The average density value $\rho_\Pi$ of the compressed flat blank is determined by the following relationship $\rho_\Pi=(1.5-2.0)B_2$, where $$B_2 = \rho\left(\frac{d}{d_1}\right)^{1.5}$$

The flat blank is made with the length that is 7-15 times the average of the outer diameter $D_O$ and of the internal diameter $D_I$ of the finished bushing, with a width greater than the height $H_C$ of the finished bushing, but less than the value $$H_C \frac{\rho_C}{\rho_\Pi},$$

where $\rho_C$ is the average density of the MR material in the finished bushing. The pressed flat blank is wound at least in 3 layers on an elastomer cylinder with such a tension that ensures the outer diameter of the roll obtained is equal to the diameter $D_O$. The elastomer cylinder height is made greater than the width of the compressed flat blank, and the elastomer cylinder diameter is made less than the diameter $D_I$. The roll is placed into a mold providing the manufacture of a bushing blank with its average density greater than that of the compressed flat blank by 1.3-2.2 times, with its internal diameter $D_I$ and with the wall thickness less than 0.14 $D_O$. The final pass of the bushing blank pressing is carried out to the value of average density $\rho_C$ greater than $\rho_\Pi$, but less than 0.8 $\rho$. Some elastic medium is placed inside said roll, and the roll is pressed in several passes by axial compression together with the elastic medium elements transforming the axial compression into radial pressure on the roll to be compressed.

BRIEF DESCRIPTION OF THE DRAWINGS

The essence of the technical solution according to the present invention, as an embodiment version, is illustrated by drawings.

DETAILED DESCRIPTION

As starting material for the manufacture of thin-walled elastoporous parts in the MR material with the application of the process of the present invention, fragments of a metal wire spiral having a lead equal to the spiral diameter are used, said spiral fragments being used to mold a flat rectangular blank.

The value of average density $\rho_3$ for the flat blank is selected depending on the outer diameter $d_1$ of the spiral, on the diameter d of the wire cross-section and on the density $\rho$ of the wire material, that are bound by the following relation $\rho_3=(2.0-2.8)B_1$, where $$B_1 = \rho\left(\frac{d}{d_1}\right)^2.$$

After that, the flat blank is compressed in the direction perpendicular to the blank plane to get the average density value $\rho_\Pi=(1.5-2.0)B_2$, where $$B_2 = \rho\left(\frac{d}{d_1}\right)^{1.5}.$$

Said pressing provides a more uniform structure of the MR material in the radial direction. In so doing, the relations given above for the densities enable to develop efficient technological processes for the manufacture of elastoporous parts in the form of bushings.

Figure 1:
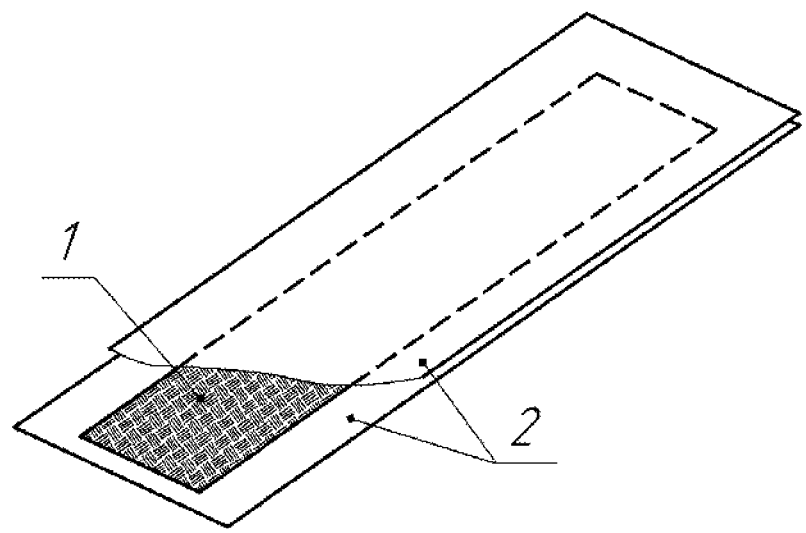
FIG. 1 shows a flat blank placed between two elastic plates.
Figure 2:
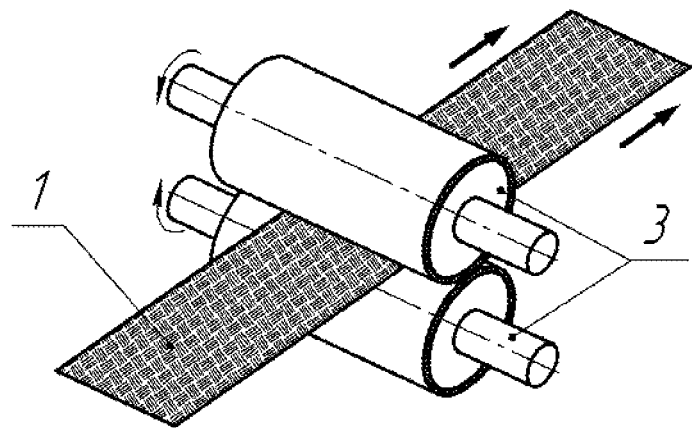
FIG. 2 shows a flat blank while compressed between cylindrical rollers with an elastic coating.
Figure 3:
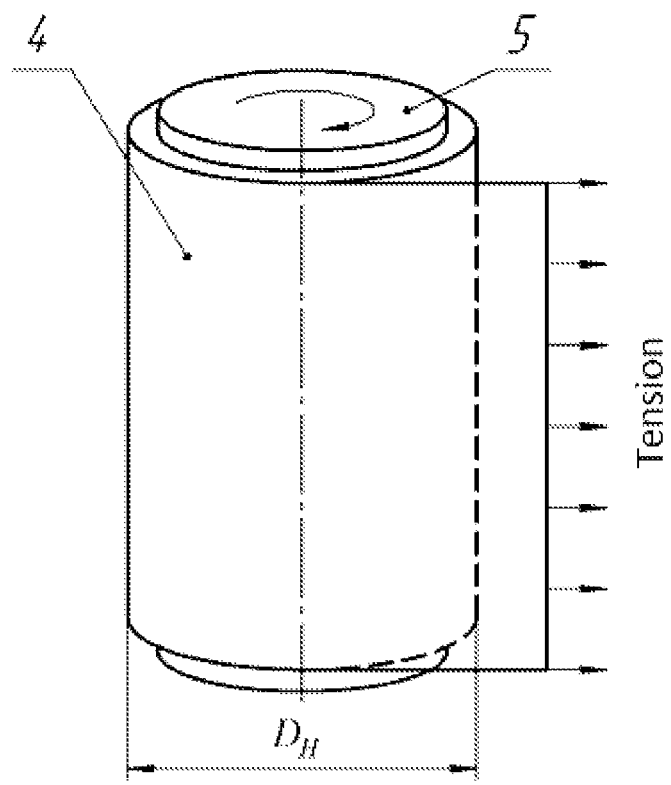
FIG. 3 shows a pressed flat blank wound on an elastomer cylinder with some tension.

During the pressing procedure, to provide a uniform distribution of the pressure on the flat blank 1 (FIG. 1), the last is placed with its whole length between two sheets 2 of elastic material (polyurethane, rubber, etc.). In another embodiment (FIG. 2), the flat blank 1 is pressed by rolling between cylindrical rollers 3 with an elastic coating (polyurethane, rubber, etc.).

The length of a flat blank is taken 7-15 times the average value of the outer diameter $D_O$ and the inner diameter $D_I$ of the finished bushing, the width of the same being greater than the height $H_C$ of the finished bushing but less than the value $$H_C\frac{\rho_C}{\rho_\Pi},$$

where $\rho_C$ is the average density of the MR material in the finished bushing.

Figure 4:
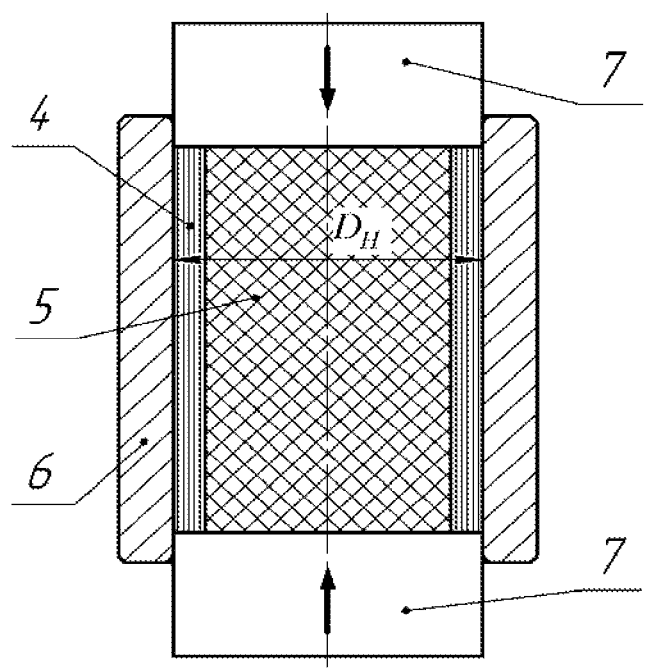
FIG. 4 shows a mold in the process of a radial-axial pressing.

The pressing procedure finished, the flat blank 4 (FIG. 4) is wound in at least 3 layers onto an elastomer cylinder 5 with some tension, which provides for obtaining the outer diameter of the prepared composition equal to the diameter $D_O$.

The height of the elastomer cylinder is taken greater than the width of the compressed flat blank, and the diameter of the elastomer cylinder is less than the diameter $D_O$.

The composition comprised of the compressed flat blank 4 (FIG. 4) wound onto the elastomer cylinder 5 is placed into a mold sleeve 6 between cylindrical punches 7 having continuous ends.

During the next pass, radial pressing is carried out to give a bushing blank with the average density 1.3-2.2 times greater than that of a compressed flat blank, and with the inner diameter $D_I$.

Figure 5:
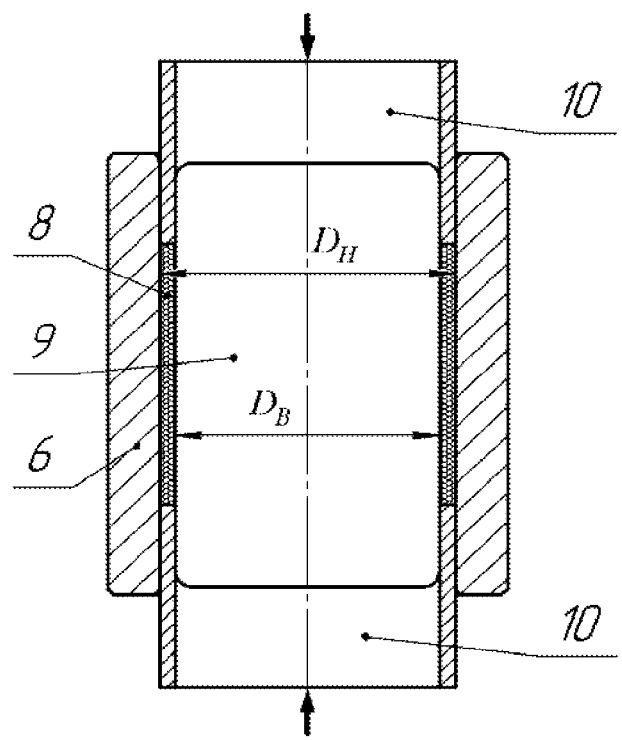
FIG. 5 shows a mold at the final pass of the bushing blank pressing.

After pressing, the punches 7 and the elastomer cylinder 5 are removed from the mold sleeve 6. Through the obtained opening in the bushing blank 8 (FIG. 5), a metal rod 9 with the outer diameter $D_O$ is passed. After that, punches 10 with annular working surfaces are placed and the final axial pressing of the bushing blank 8 is carried out to get the average density $\rho_C$ greater than the density $\rho_\Pi$, but less than 0.8 $\rho$. In this procedure, the calibration of the bushing surfaces is provided.

Figure 6:
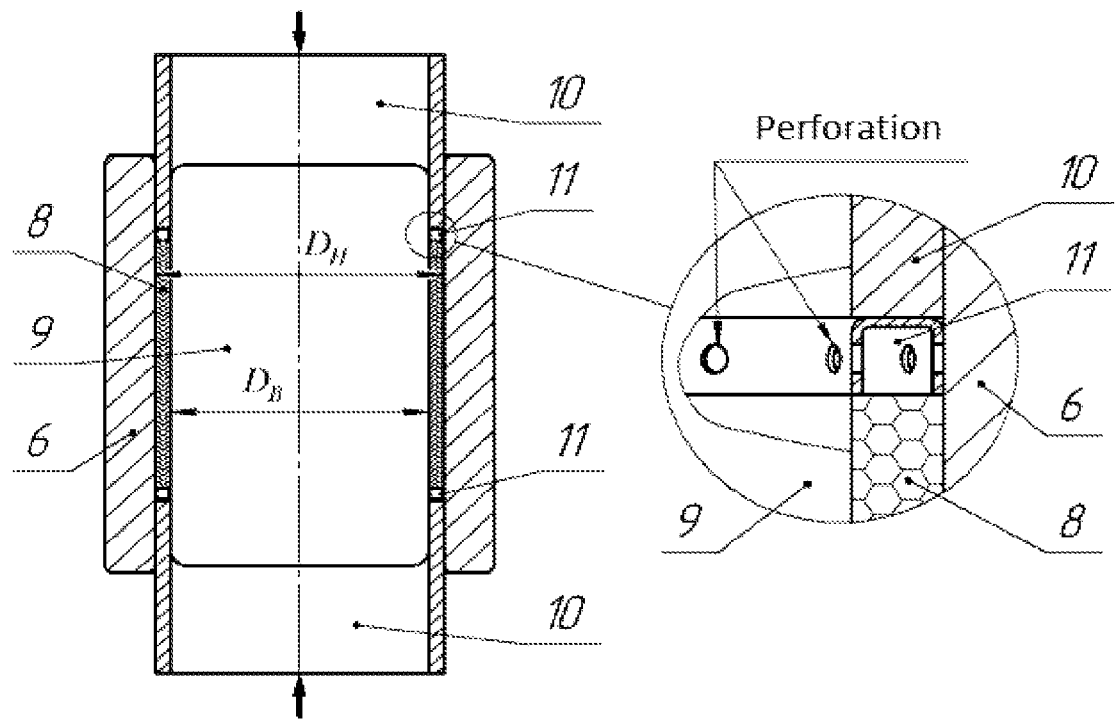
FIG. 6 shows a mold at the final pass of the bushing blank pressing together with perforated annular shells having a U-shaped meridian section.

According to another embodiment of the production process, onto the metal rod 9 (FIG. 6), from both sides, additional annular shells 11 with a U-shaped meridian section and with perforated lateral surfaces are placed until contacting the bushing blank 8, and then the punches 10 are introduced until contacting the shells 11. After that, in the mold sleeve 6, the final axial pressing of the bushing blank 8 is carried out to get the average density value $\rho_C$ greater than $\rho_\Pi$, but less than 0.8 $\rho$, providing for the calibration of the bushing surfaces, as well as for pressing the bushing blank ends into the annular shells 11.

Figure 7:
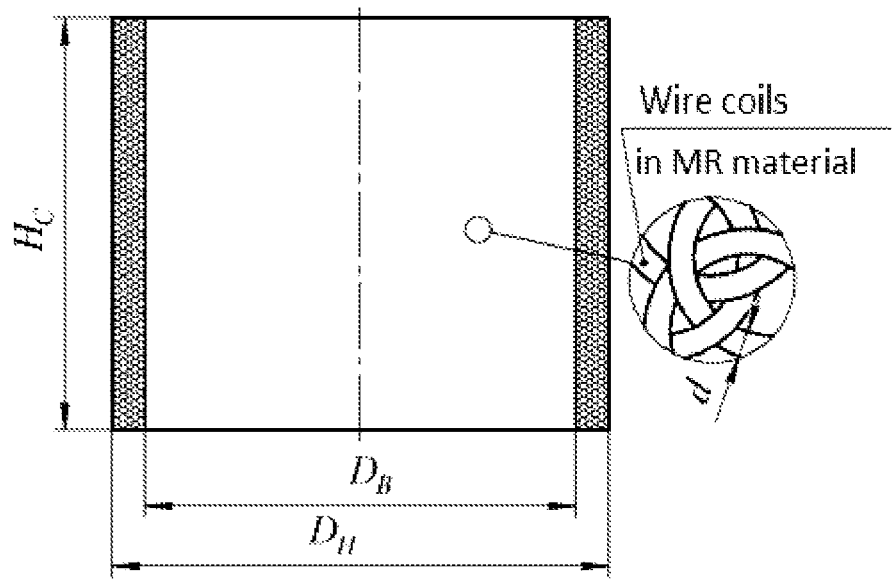
FIG. 7 shows a finished elastoporous part in the form of a bushing.

A representative structure of a thin-walled elastoporous part in the form of a bushing in the MR material, according to the first embodiment of the process, is illustrated in FIG. 7.

Figure 8:
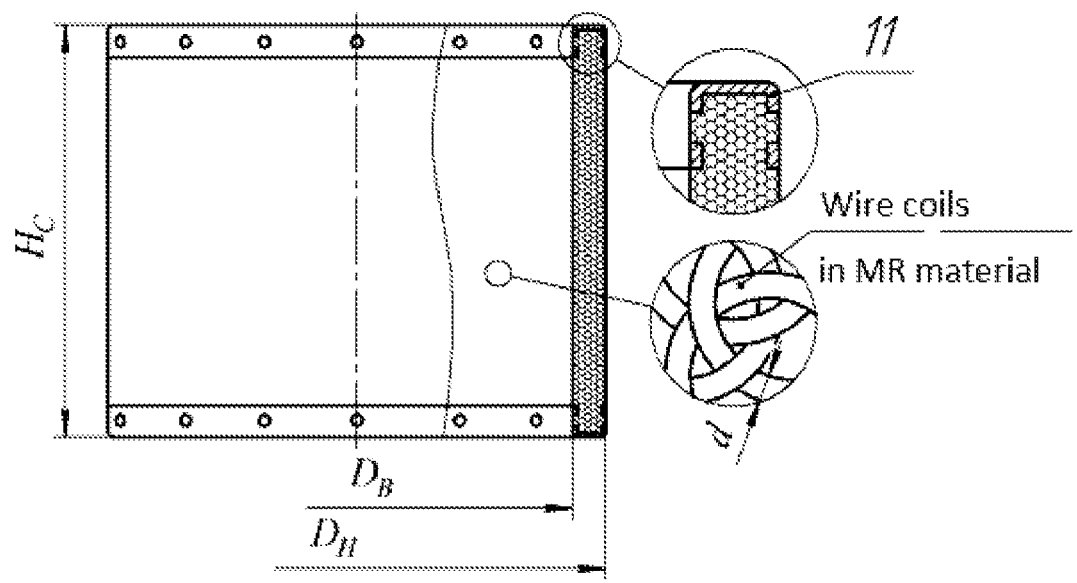
FIG. 8 shows a finished elastoporous part in the form of a bushing with perforated annular shells embedded on their ends and having a U-shaped meridian section.

A representative structure of a thin-walled elastoporous part in the form of a bushing in the MR material, provided with annular shells with a U-shaped meridian section and with perforated lateral walls, according to the production process of the present invention, is illustrated in FIG. 8. It is necessary to observe, that at the second pressing stage, the MR material of the bushing blank completely fills the internal space of the meridian section U-shaped annular shells 11, including the punched openings. This fact provides for a reliable fixation of the shells on the ends of the elastoporous part and for the increase of the active filtering surface, with simultaneous reduction of dead zones.

Example. In laboratory conditions, thin-walled elastoporous parts in the form of bushings made in MR material were manufactured from stainless steel wire of diameter d=0.2 mm, steel grade X-12Cr18Ni10Ti, GOST 18143-72 (wire material density p=7.8 g/cm³). The dimensions of a finished bushing: outer diameter $D_O$=95 mm, inner diameter $D_I$=85 mm, height $H_C$=70 mm. The weight of the part is 300 g, the average density of the MR material $\rho_C$=3.03 g/cm³.

First, wire fragments in the form of extended spirals with the outer diameter $d_1$=0.2 mm and the coil lead of 1.2 mm were obtained. The resulting fragments were used to mold a flat rectangular blank with the dimensions 200×1000 mm. In this case, the average density of the flat blank was selected on the basis of a calculated range of values $\rho_3$=(2.0-2.8) $B_1$=0.4-0.6 g/cm³, where $$B_1 = \rho\left(\frac{d}{d_1}\right)^2,$$

and was adopted equal to 0.46 g/cm³.

Then, the flat blank was submitted to pressing with rollers in the direction perpendicular to the blank plane until obtaining the average density $\rho_\Pi$=0.88 g/cm³, that was selected from a calculated range of values $\rho_\Pi$=(1.5-2.0) $B_2$=0.8-1.1 g/cm³, where $$B_2 = \rho\left(\frac{d}{d_1}\right)^{1.5}.$$

A compressed flat blank was wounded in 4 layers onto a polyurethane cylinder with the diameter of 80 mm and the height of 210 mm. Maintaining the blank under tension, the outer diameter $D_O$ of the combination was obtained equal to 95 mm.

At the next pass, the combination was placed into a mold sleeve between cylindrical punches with flat continuous ends, and the axial force of 16 t was applied to the same to carry out a radial-axial pressing. In this case, the average density of the bushing blank was 1.3 g/cm³, and its inner diameter $D_I$=85 mm.

Through the opening formed in the bushing blank, a metal rod with the outer diameter $D_O$=85 mm was passed, and punches with annular working surfaces were mounted. In the case of manufacture of elastoporous parts with shells, the last were mounted onto said rod before mounting the punches. The final axial pressing of the bushing blank was carried out until getting the finished bushing height $H_C$=70 mm, applying the pressing force of 25 t. In so doing, the average density of the MR material in the finished bushing $\rho_C$=3.03 g/cm³.

As a result, a new process for the manufacture of thin-walled elastoporous parts in the form of bushings in the MR material is provided, said bushings showing high reliability with predetermined characteristics of elastoporosity. The last parameter is provided by the selection of the most efficient relationships for the geometrical parameters, as well as by the proportion of the pressing for a flat blank, of the radial-axial pressing for a bushing blank and of the axial pressing for the finished bushing. The above described relationship of the technological parameters for said passes enables to develop a rational technological procedure implementing the process of the present invention. Furthermore, the productivity is increased and the manufacture of a wide range of thin-walled bushing-type elastoporous parts in the MR material is simplified, said parts demonstrating a high reliability and being used for the purposes of the anti-vibration protection, of the filtering liquid and gaseous media, etc.

The invention claimed is:

1. A process for the manufacture of thin-walled elastoporous elements in the form of bushings in metal-rubber material (MR), comprising the following steps:
   obtaining wire fragments comprised of a wire material having a wire cross-section, in the form of spiral segments;
   forming a flat blank from said spiral segments;
   pressing the flat blank in a direction perpendicular to a blank plane,
     wherein an average density value $\rho_3$ of the flat blank is adjusted depending on a spiral outer diameter $d_1$, on a diameter d of the wire cross-section, and on the density $\rho$ of the wire material, linked by the following relationship $\rho_3$=(2.0–2.8)$B_1$, where $$B_1 = \rho\left(\frac{d}{d_1}\right)^2,$$

wherein an average density value $\rho_\Pi$ of the compressed flat blank is determined by the following relationship $\rho_\Pi$=(1.5–2.0)$B_2$, where $$B_2 = \rho\left(\frac{d}{d_1}\right)^{1.5},$$

wherein the flat blank is formed with a length that is 7 to 15 times the average of an outer diameter $D_O$ and of an internal diameter $D_I$ of the finished bushing, with a width greater than a height $H_C$ of the finished bushing, but less than a value $$H_C \frac{\rho_C}{\rho_\Pi},$$

where $\rho_C$ is an average density of the MR material in the finished bushing,
   winding the pressed flat blank at least in 3 layers on an elastomer cylinder with such a tension that ensures an outer diameter of a roll obtained is equal to the diameter $D_O$,
     wherein an elastomer cylinder height is greater than a width of the compressed flat blank,
     wherein an elastomer cylinder diameter is less than the diameter $D_I$,
   placing the roll into a mold providing the manufacture of a bushing blank with its average density greater than that of the compressed flat blank by 1.3 to 2.2 times, with an internal diameter $D_I$ and with a wall thickness less than 0.14 $D_O$,
wherein the final pass of the bushing blank pressing is carried out to the value of average density $\rho_C$ greater than $\rho_\Pi$, but less than 0.8$\rho$;
   placing elastic elements inside said roll;
   pressing the roll in several passes by axial compression together with the elastic elements transforming the axial compression into radial pressure on the roll to be compressed.

2. The process of claim 1, wherein the bushing blank is additionally provided, on both ends, with perforated annular shells with a U-shaped meridian section, and the final pressing pass of the bushing blank is carried out in a metal mold without elastomers, with simultaneous deepening the ends of the bushing blank into the perforated annular shells with the U-shaped meridian section.

3. The process of claim 1, wherein in the process of pressing the flat blank, the flat blank is placed with flat surfaces against elastic sheets.

4. The process of claim 1, wherein the flat blank is pressed by rolling between cylindrical rollers with elastic coating.

* * * * *